United States Patent [19]

Semasa

[11] Patent Number: 5,418,626
[45] Date of Patent: May 23, 1995

[54] IMAGE PROCESSING DEVICE FOR RESOLUTION CONVERSION

[75] Inventor: Takayoshi Semasa, Kamakura, Japan

[73] Assignee: Mitsubishi Denki Kabushiki Kaisha, Tokyo, Japan

[21] Appl. No.: 32,810

[22] Filed: Mar. 17, 1993

[30] Foreign Application Priority Data

Mar. 19, 1992 [JP] Japan .................. 4-063430

[51] Int. Cl.⁶ .......................... H04N 1/393
[52] U.S. Cl. .................. 358/451; 358/453; 358/455; 358/447; 382/298
[58] Field of Search ............ 358/429, 445, 455, 447, 358/451, 458, 459, 456, 428, 448, 453; 382/50, 54, 47

[56] References Cited

U.S. PATENT DOCUMENTS

| | | | |
|---|---|---|---|
| 4,194,221 | 3/1980 | Stoffel | 358/456 |
| 4,484,347 | 11/1984 | Kashioka | 358/451 |
| 4,930,021 | 5/1990 | Okada | 358/445 |
| 5,010,497 | 4/1991 | Shimata | 358/455 |
| 5,125,045 | 6/1992 | Murakami et al. | 358/456 |
| 5,131,059 | 7/1992 | Kobayashi et al. | 358/429 |
| 5,153,749 | 10/1992 | Katayama | 358/445 |
| 5,200,839 | 4/1993 | Uchizono | 358/429 |
| 5,251,046 | 10/1993 | Kato et al. | 358/429 |

FOREIGN PATENT DOCUMENTS

| | | |
|---|---|---|
| 0206401 | 6/1986 | European Pat. Off. . |
| 3-97370 | 4/1991 | Japan . |
| WO90/09075 | 8/1990 | WIPO . |

OTHER PUBLICATIONS

Xerox Disclosure Journal "A Density Preserving Digital Image Magnifier/Reducer" Jerry L. Potter, Dec. 1979.

IEEE Transactions on Communications "Survey of Electrohnic Techniques for Pictorial Image Reproduction" Stoffel & Moreland, 1981.

H. Morita, et al "Rapid Pixel Density Conversion Based on the Projection Method" Proceedings of the Image & Electronics Engin.

Primary Examiner—Edward L. Coles, Sr.
Assistant Examiner—Fan Lee
Attorney, Agent, or Firm—Wolf, Greenfield & Sacks

[57] ABSTRACT

An image processing device for effecting resolution conversion includes an image signal memory (1) for storing the input pixel levels $I_{xy}$, and an enlargement/reduction calculator circuit (2) for calculating a grey level $G_{XY}$ of each output pixel corresponding to the average of the areas of input pixel intersecting with the output pixel. The error occurring upon quantization by a quantizer (4) is calculated by an error calculator (5), and, after being delayed by one pixel by an error memory (6), is fed back to a image signal compensator circuit (3) to be added to the grey level S3 to obtain the compensated gray level S4, which is quantized by the quantizer (4) to obtain the quantized level $O_{XY}$.

40 Claims, 9 Drawing Sheets

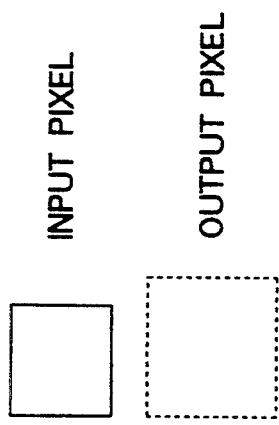
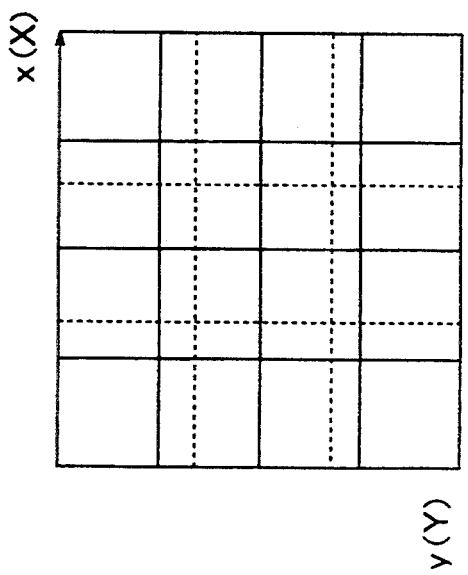
FIG. 3a
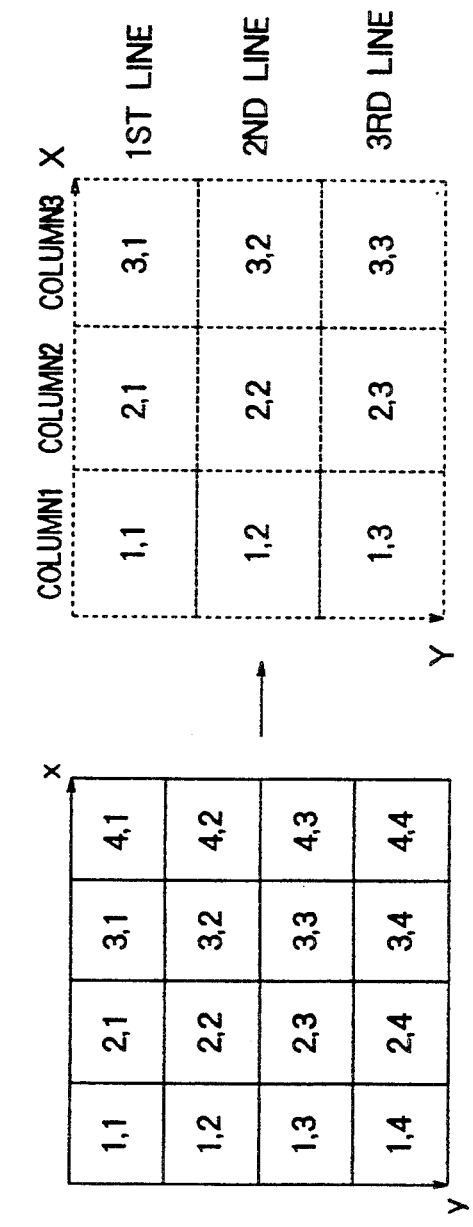
FIG. 3b

FIG. 4a

1ST LINE

| OUTPUT | INPUT IMAGE SIGNAL (COORD.) | | | | WEIGHTS | | | |
|---|---|---|---|---|---|---|---|---|
| | S2a | S2b | S2ca | S2d | S8a | S8b | S9a | S9b |
| COL1 | (1,1) | (2,1) | (1,2) | (2,2) | 3/4 | 1/4 | 3/4 | 1/4 |
| COL2 | (2,1) | (3,1) | (2,2) | (3,2) | 2/4 | 2/4 | | |
| COL3 | (3,1) | (4,1) | (3,2) | (4,2) | 1/4 | 3/4 | | |

FIG. 4b

2ND LINE

| OUTPUT | INPUT IMAGE SIGNAL (COORD.) | | | | WEIGHTS | | | |
|---|---|---|---|---|---|---|---|---|
| | S2a | S2b | S2ca | S2d | S8a | S8b | S9a | S9b |
| COL1 | (1,2) | (2,2) | (1,3) | (2,3) | 3/4 | 1/4 | 2/4 | 2/4 |
| COL2 | (2,2) | (3,2) | (2,3) | (3,3) | 2/4 | 2/4 | | |
| COL3 | (3,2) | (4,2) | (3,3) | (4,3) | 1/4 | 3/4 | | |

FIG. 4c

3RD LINE

| OUTPUT | INPUT IMAGE SIGNAL (COORD.) | | | | WEIGHTS | | | |
|---|---|---|---|---|---|---|---|---|
| | S2a | S2b | S2ca | S2d | S8a | S8b | S9a | S9b |
| COL1 | (1,3) | (2,3) | (1,4) | (2,4) | 3/4 | 1/4 | 1/4 | 3/4 |
| COL2 | (2,3) | (3,3) | (2,4) | (3,4) | 2/4 | 2/4 | | |
| COL3 | (3,3) | (4,3) | (3,4) | (4,4) | 1/4 | 3/4 | | |

ORIGINAL

REDUCED ACCORDING TO THIS INVENTION

REDUCED WITH NNM

REDUCED WITH PM

FIG. 7a — REDUCED ACCORDING TO THIS INVENTION
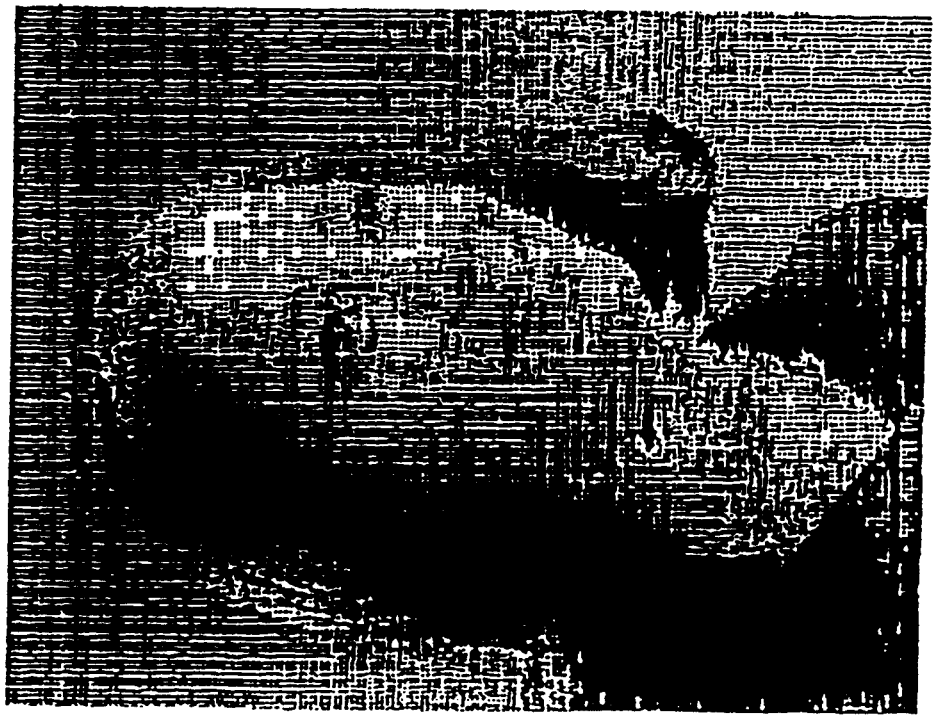
FIG. 7b — REDUCED WITH NNM

IMAGE PROCESSING DEVICE FOR RESOLUTION CONVERSION

BACKGROUND OF THE INVENTION

This invention relates to image processing devices for resolution conversion, utilized in image transmission systems, storage apparatus, etc., including scanners, copying machines and facsimile machines.

In image processing systems, it often becomes necessary to convert the resolution of the images. In the case of the facsimile machines, for example, the text and drawing images (without half-tone areas) are first subjected to simple bi-level thresholding. The half-tone images, on the other hand, are subjected to the dithering process. The resolution of the bi-level image that is obtained by these processes is designated by the user. Further, the information is encoded by a coding method such as MMR. When this information is transmitted to another facsimile machine, the resolution of the image must be converted such that the format of the information is adapted to the paper size and the resolution of the type of the machine to which the image is transmitted. Thus, an image scanned in an inch-based Group 4 facsimile machine should be subjected to an appropriate resolution conversion before being sent to a millimeter-based Group 3 machine.

The most commonly used method for effecting the resolution conversion (or the enlargement/reduction) of the images is the nearest neighbor method (NNM). According to this method, the input and the output sampling points are plotted upon the image to be converted, and the signal level at the input sampling point nearest to the current output sampling point is selected as the output signal level.

The nearest neighbor method (NNM) is a simple and efficient method for resolution conversion. However, this method has the defect that thin lines may be dropped. Thus, for obtaining better conversion image quality, various methods of resolution conversion, such as the method of taking a logical sum, the method of dividing into nine partitions, and the rapid projection method, are proposed. For details of such methods, the reference may be had, for example, to H. Morita et al., "RAPID PIXEL DENSITY CONVERSION METHOD BASED ON THE PROJECTION METHOD", Proceedings of The Institute of Image and Electronics Engineers of Japan, Vol. 11, No. 2, pp. 72-83, 1982.

These methods of resolution conversion, however, are primarily aimed at converting the binary image consisting of texts and drawings without half-tone areas. When these resolution conversion methods are applied to quasi-half-tone input image signal, which is obtained, for example, by means of the ordered dither method (ODM) or the error diffusion method, the grey scale gradation may be degraded, or moire patterns may be developed in the converted image. The quality of the converted image thus suffers a conspicuous degradation.

SUMMARY OF THE INVENTION

It is therefore an object of this invention to provide a image processing device for resolution conversion by which the gradation of the the original image is preserved and the moires are not developed such that a converted image of a good quality is obtained.

The above object is accomplished in accordance with the principle of this invention by an image processing device for effecting resolution conversion of an image consisting of a matrix of pixels, which comprises: image signal memory means for temporarily storing an input image signal representing input pixel levels of an original image; grey level calculation means, coupled to the image signal memory, for calculating a grey level of each output pixel by calculating a weighted sum of the input pixel levels having an intersection with the output pixel; and quantization and compensation means, coupled to the grey level calculation means, including: compensation means for compensating the grey level of each output pixel for a quantization error, thereby obtaining a compensated gray level for each output pixel; quantization means for quantizing the compensated gray level of each output pixel, thereby obtaining a quantized level of each output pixel; and error calculation means for determining the quantization error from the compensated gray level and the quantized level. Preferably, the weighted sum calculated by the grey level calculation means is obtained by: multiplying the input pixel levels intersecting with the output pixel by weighting coefficients and then taking a sum of the input pixel levels multiplied by the weighting coefficients, wherein the weighting coefficients corresponds to respective ratios of intersecting areas of the input pixels to an area of the output pixel.

It is further preferred that the compensation means adds the quantization error to the grey level of each output pixel, to obtain the compensated gray level; and the error calculation means includes: means for calculating a difference between the compensated gray level of each output pixel and the quantized level of each output pixel; and error memory means for delaying the difference by one pixel to obtain the quantization error added to the grey level by the compensation means. Still preferably, the error calculation means includes: means for calculating a difference between the compensated gray level of each output pixel and the quantized level of each output pixel; and error memory means for storing the differences between the compensated gray levels and the quantized levels calculated for respective output pixels; and the compensation means includes: means for calculating a weighted sum of the differences between the compensated gray levels and the quantized levels of output pixels which are in a predetermined neighborhood of a current pixel; and adder means for adding the weighted sum of differences to the grey level of each output pixel to obtain the compensated gray level of each output pixel. It is further preferred that the device further includes: image segmentation circuit means for receiving the input image signal and for determining whether or not a current input pixel is in a quasi-half-tone region, wherein, upon determining that the current input pixel is in the quasi-half-tone region, the image segmentation circuit means suppresses the compensation means to compensate for the quantization error, such that the compensated gray level of each output pixel calculated by the compensation means is identical to the grey level of each output pixel.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 3a is a diagram showing the relation of the pixels before and after resolution conversion;

FIG. 3b is a diagram showing the relation of the coordinates (the column and the line indices) of pixels before and after resolution conversion;

FIG. 4a is a table showing the correspondence of the binary components S2a through S2d of the image signal S2 shown in FIG. 2 and the coordinates of the input pixels (the left half of the table), and the values of the weighting calculations S8a through S9b (the right half of the table) for the first line of output image;

FIG. 4b is a table similar to FIG. 4a, but showing the case for the second line of output image;

FIG. 4c is a table similar to FIG. 4a, but showing the case for the third line of output image;

FIG. 7a is a 5/7 reduction image obtained by means of the embodiment of FIG. 5 according to this invention from the original bi-level image generated from a portrait (the facsimile test chart No. 1 of the Institute of the Image and Electronics Engineers of Japan) using the ordered dither method (ODM) at 4×4;

FIG. 7b is a view similar to that of FIG. 7a, but showing an image obtained with nearest neighbor method (NNM);

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
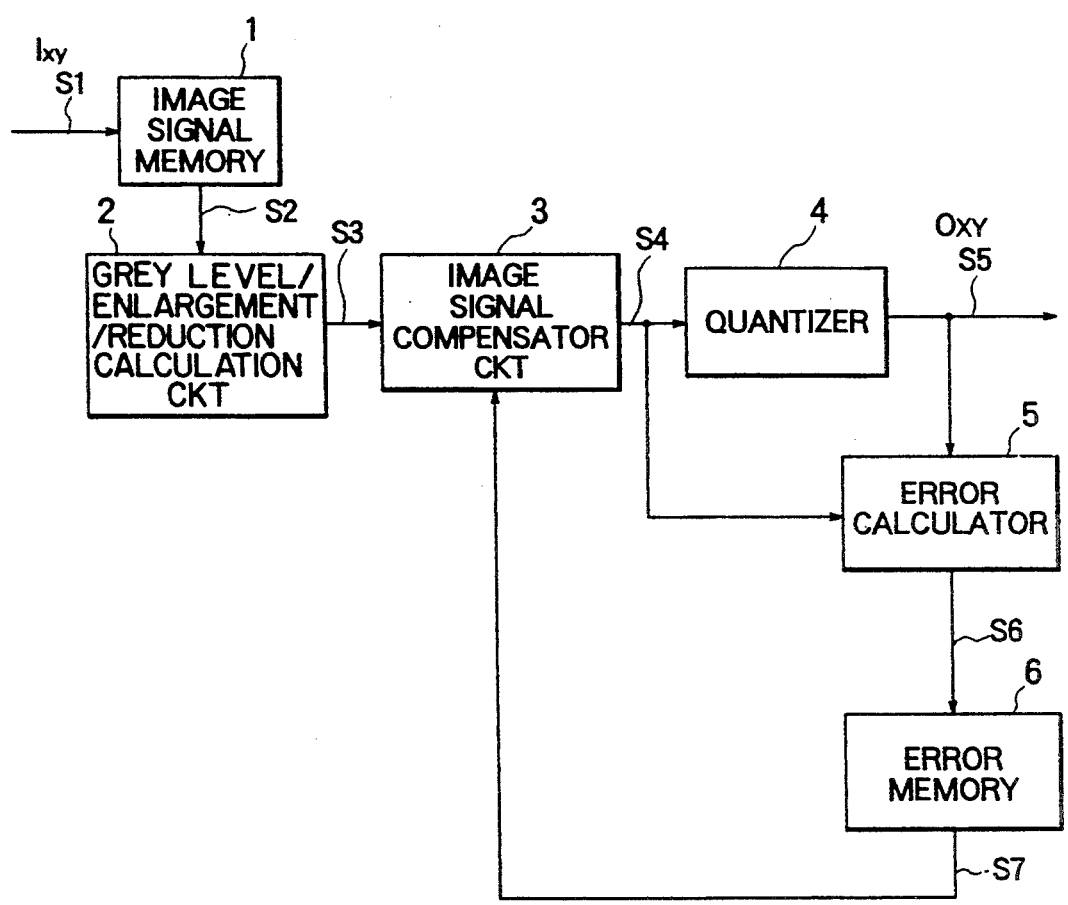
FIG. 1 is a block diagram showing the structure of the image processing device according to the first embodiment of this invention.

First, however, before embarking upon describing the details of particular embodiments, the principle of this invention is described referring to FIG. 1 of the drawings. It is assumed that the original image consisting of a (n,m)-matrix of bi-level black and white pixels is subjected to resolution conversion to obtain a (N,M)-matrix of bi-level pixels. The resolution conversion is necessitated, for example, when the image is enlarged or reduced in size. When, for example, the image is reduced to 75 percent or ¾ of the original size, $N=(\frac{3}{4})n$ and $M=(\frac{3}{4})m$. In FIG. 1, the input image signal S1 is a signal representing the binary levels $I_{xy}$ of the pixel at the x'th column and y'th line of the original image, or the (x,y)-element of the (n,m)-matrix, where $1 \leq x \leq n$ and $1 \leq y \leq m$. The output image signal S5 is a signal representing the binary levels $O_{XY}$ for the pixel at the X'th column and Y'th line of the image after conversion, or the (X,Y)-element of the (N,bi)-matrix, where $1 \leq X \leq N$ and $1 \leq Y \leq M$. In both cases, the black and white pixels are represented by '0' and '1' respectively. The exemplary relation of the input and output pixels for 75 reduction is shown in FIGS. 3a and 3b.

First, input binary levels $I_{xy}$ (contained in the input image signal S1) of those pixels included in a predetermined number of lines of the (n,m)-matrix of the original image are temporarily stored in an image signal memory 1. Then, an enlargement/reduction calculator circuit 2 reads out from the image signal memory 1 the input binary pixel levels $I_{xy}$ (as indicated in FIG. 1 by a signal S2 supplied from the image signal memory 1 to the enlargement/reduction calculator circuit 2) needed for the resolution conversion of the current output pixel, and obtains an intermediate signal S3 representing the grey level $G_{XY}$ of the pixels of the (N,M)-matrix. The grey level $G_{XY}$ at the current coordinate (X,Y) of the (N,M)-matrix is calculated by the enlargement/reduction calculator circuit 2 as follows:

$$G_{XY} = \Sigma(W_{xy} \times I_{xy}) \quad (1)$$

where the $W_{xy}$ are weighting coefficient determined by:

$$W_{xy} = S(P_{XY} \cap P_{xy})/S(P_{XY}) \quad (2)$$

In equation (2), $P_{xy}$ represents the pixel at (x,y) of the (n,m)-matrix of the image before conversion, $P_{XY}$ represents the pixel at (X,Y) of the (N,M)-matrix of the image after conversion, $S(P_{XY} \cap P_{xy})$ represents the area of the intersection or overlap of the input and output pixels $P_{XY}$ and $P_{xy}$, and $S(P_{XY})$ represents the area of the output pixel $P_{XY}$. The summation in equation (1) is taken over all the indices (x,y) of the input pixels $P_{xy}$ which have an overlap with the current pixel $P_{XY}$. It should be noted that, throughout this specification, the lower case indices (x,y) are used to denote the coordinates of the (n,m)-matrix of the image before conversion, to distinguish them from the coordinates of the (N,M)-matrix of the image after the conversion, which are denoted by the upper case indices (X,Y).

The the grey level $G_{XY}$ is thus calculated by the enlargement/reduction calculator circuit 2 by means of the equations (1) and (2). Further, an image signal compensator circuit 3 calculates the signal S4 representing the compensated grey level $C_{XY}$ at (X,Y) of the (N,M)-matrix as follows:

$$C_{XY} = G_{XY} + K_a \times E \quad (3)$$

where $K_a$ is a feedback parameter which may be set equal to unity ($K_a=1$), and E is the error signal output from an error memory 6 as described below.

Further, a quantizer 4 quantizes the compensated grey level $C_{XY}$ at the output coordinate (X,Y) by thresholding, for example, at ½, and thereby obtains the output image signal S5 representing the quantized binary level $O_{XY}$ at (X,Y) of the (N,M)-matrix of the image after the conversion. The binary level $O_{XY}$ at (X,Y) is determined by:

$$O_{XY} = \begin{array}{l} 1 \text{ where } C_{XY} \geq 1/2, \text{ and} \\ 0 \text{ where } C_{XY} < 1/2 \end{array} \quad (4)$$

The error signal E appearing in the equation (3) is obtained by means of an error calculator 5 and error memory 6. Namely, the error calculator 5 calculates the error E at coordinate (X,Y) by:

$$E = K_b \times (C_{XY} - O_{XY}) \quad (5)$$

where $K_b$ is a feedback parameter which may be set equal to unity ($K_b = 1$).

The error E is stored in the error memory 6, and thence is fed back to the image signal compensator circuit 3, to be used in the calculation of the compensated grey level of the next pixel by means of equation (3), such that the average gradation of the original image is preserved faithfully.

In the case of equation (3), the error E is simply fed back to the image signal compensator circuit 3 to calculate the compensated grey level of the next pixel. However, according to a more sophisticated method described in detail below, the error E may be distributed among a plurality of pixels of the (N,M)-matrix after conversion. These embodiments are described in detail below, by reference to FIGS. 5 and 8.

Figure 2:
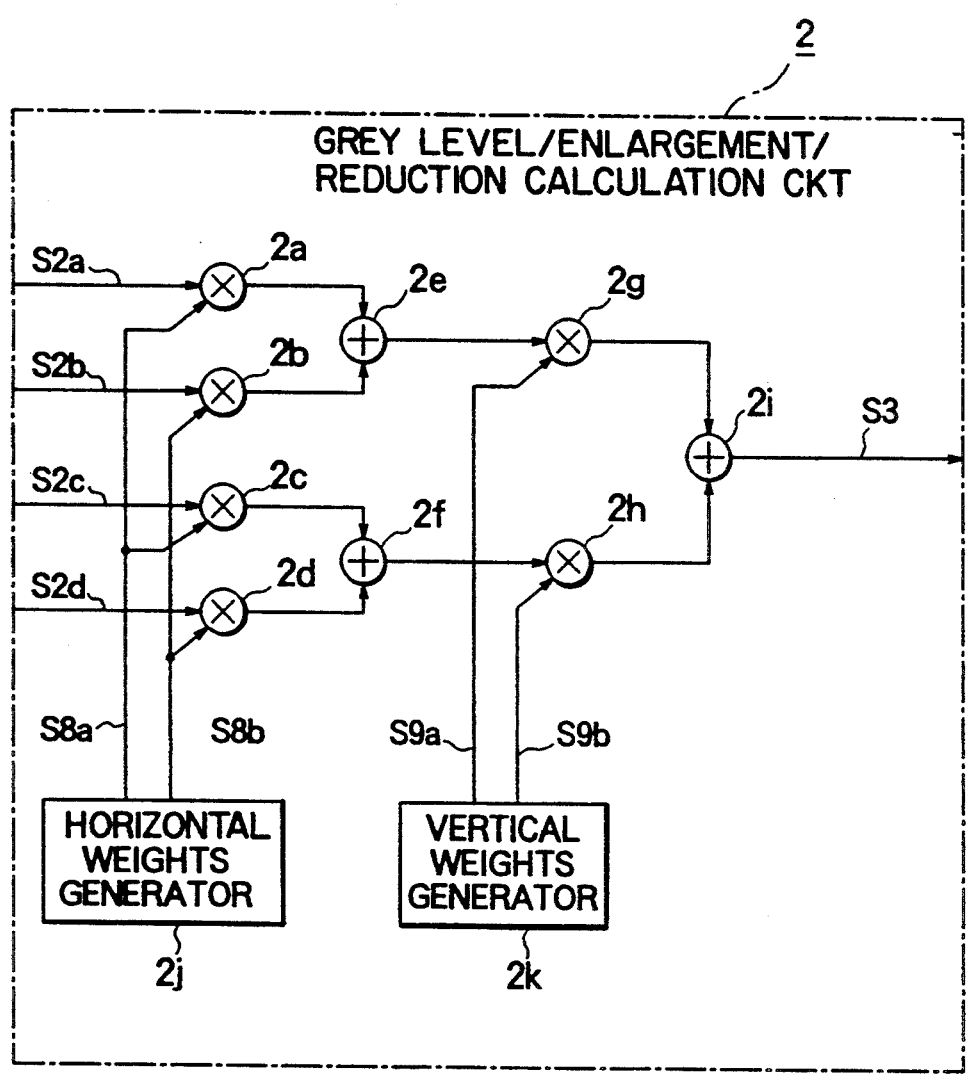
FIG. 2 is a block diagram showing the structure of the enlargement/reduction calculator circuit of FIG. 1.

Next, referring to FIGS. 1 through 4, a first embodiment of this invention, which is a simple implementation of the above described principle, is described. FIG. 1 is a block diagram showing the structure of the image processing device according to the first embodiment of this invention. FIG. 2 is a block diagram showing the structure of the enlargement/reduction calculator circuit of FIG. 1. For easier comprehension, the embodiment is described in a particular case where the resolution conversion is effected to reduce the size of the image to three fourth (¾) of the original.

In FIG. 1, an image signal memory 1 temporarily stores the input image signal S1. An enlargement/reduction calculator circuit 2, coupled to the image signal memory 1 to receive the output S2 thereof, effects a weighting calculation at a 8-bit precision in accordance with the magnification rate (enlargement/reduction factor). An image signal compensator circuit 3 receives the output S3 of the enlargement/reduction calculator circuit 2 and adds to it the quantization error of the preceding pixel output from a error memory 6. A quantizer 4 quantizes the output signal S4 of the image signal compensator circuit 3 by a fixed threshold level ½. Further, upon receiving the quantization output S5 from the quantizer 4 and the output signal S4 of the image signal compensator circuit 3, an error calculator 5 calculates the quantization error by subtracting the former signal S5 from the latter signal S4. An eight-bit error memory 6 coupled to the error calculator 5 stores the quantization error signal S6 and thereby delays it by one pixel.

FIG. 2 shows the details of the enlargement/reduction calculator circuit 2. The signal S2 output from the image signal memory 1 consists of four bi-level signals S2a, S2b, S2c and S2d. The binary signals S2a, S2b, S2c and S2d are coupled to multipliers 2a, 2b, 2c, and 2d, respectively, which effect the multiplication for the enlargement/reduction in the horizontal direction. Adders 2e and 2f output the results of the weighting calculations for the upper and lower lines of the original image, respectively. Multipliers 2g and 2h are the multipliers for the enlargement/reduction in the vertical direction. An adder 2i receives the outputs of the two multipliers 2g and 2h and outputs the output signal S3 of the result of the final weighting calculation. A horizontal weighting coefficients generator 2j generate the horizontal weighting coefficients S8a and S8b. The weighting coefficient S8a is supplied to the multipliers 2a and 2b. The wdf S8b is supplied to the multipliers 2c and 2d. A vertical weighting coefficients generator 2k generate the vertical weighting coefficients S9a and S9b. The wdf S9a is supplied to the multiplier 2g. The wdf S9b is supplied to the multiplier 2h.

Next, the operation of the first embodiment is described by reference to FIGS. 3a through 4c. FIG. 3a is a diagram showing the relation of the pixels before and after resolution conversion. FIG. 3b is a diagram showing the relation of the coordinates (the column and the line indices) of pixels before and after resolution conversion. FIG. 4a is a table showing the correspondence of the binary components S2a through S2d of the image signal S2 shown in FIG. 2 and the coordinates of the input pixels (the left half of the table), and the values of the weighting calculations S8a through S9b (the right half of the table) for the first line of output image. FIG. 4b is a table similar to FIG. 4a, but showing the case for the second line of output image. FIG. 4c is a table similar to FIG. 4a, but showing the case for the third line of output image. The principle of the operation of this embodiment is as described above by reference to FIG. 1.

As mentioned above, the magnification factor (the enlargement/reduction factor) is assumed to be ¾, or 75 percent reduction. When the input image signal S1 is input, the bits thereof corresponding to the first line of the input image matrix is stored in the image signal memory 1. When the bits of the input image signal S1 corresponding to the second line is received, the bits of the images S1 corresponding to the first and the second lines are supplied to the enlargement/reduction calculator circuit 2. At the same time, the bits of the images corresponding to the second line are stored in the image signal memory 1 such that they can be used for the processing of the next line of the input image.

As represented by equation (2), the weighting calculations are proportional to the areas of the input pixels projected to the current pixel of the output image. Thus, the enlargement/reduction calculator circuit 2 effects the weighting calculations with respect to the input pixel values as follows.

FIG. 3a is a diagram showing the relation of the pixels before and after resolution conversion. FIG. 3b is a diagram showing the relation of the coordinates (the column and the line indices) of pixels before and after resolution conversion. The input and output pixels are represented by boxes defined by solid and dotted lines, respectively. Each output pixel has an overlapping area with four input pixels. For example, the output pixel at (1,1) (the element at the intersection of the first column and the first line) has an overlap with the input pixels at the input coordinates (1,1), (2,1), (1,2), and (2,2). The output pixel at (2,1) (the element at the intersection of the second column and the first line) has an overlap with the input pixels at coordinates (2,1), (3,1), (2,2), and (3,2). The output pixel at (2,2) (the element at the intersection of the second column and the second line) has an overlap with the input pixels at (2,2), (3,2), (2,3), and (3,3). The other overlapping relationship of the input and output pixels can easily be seen from FIGS. 3a and 3b. The pattern shown in FIGS. 3a and 3b repeats itself for the rest of the image.

The weighting calculations $W_{xy}$ for the output pixels defined by the equation (2) above are determined from the overlapping relationship of the input and the output pixels shown in FIGS. 3a and 3b. For example, for the output pixel at (1,1), the input weighting coefficients are: $W_{11}=\frac{3}{4}\times\frac{3}{4}$, $W_{21}=\frac{1}{4}\times\frac{3}{4}$, $W_{12}=\frac{3}{4}\times\frac{1}{4}$, and $W_{22}=\frac{1}{4}\times\frac{1}{4}$. Similarly, for the output pixel at (2,1), the input weighting coefficients are: $W_{21}=2/4\times\frac{3}{4}$, $W_{31}=2/4\times\frac{3}{4}$, $W_{22}=2/4\times\frac{1}{4}$, and $W_{32}=2/4\times\frac{1}{4}$. The first factor in the above equations for the weighting coefficients $W_{xy}$ corresponds to the signal S8a or S8b generated by the horizontal weighting coefficients generator 2j. The second factor in the above equations for the weighting coefficients $W_{xy}$ corresponds to the signal S9a or S9b generated by the vertical weighting coefficients generator 2k. The enlargement/reduction calculator circuit 2 determines the values of the signals generated by the horizontal weighting coefficients generator 2j and the vertical weighting coefficients generator 2k for the current output pixel, in accordance with the overlapping relation of the input and the output pixels. The values of the signals output from the horizontal weighting coefficients generator 2j and the vertical weighting coefficients generator 2k are shown in the right half of the tables 4a through 4c.

The binary levels of the input pixels having an overlap with a current output pixel are represented by the binary signals S2a, S2b, S2c, and S2d output from the image signal memory 1. For example, for the output pixel at (1,1), $S2a=I_{11}$, $S2b=I_{21}$, $S2a=I_{12}$, and $S2a=I_{22}$. For the output pixel at (2,1), $S2a=I_{21}$, $S2b=I_{31}$, $S2a=I_{22}$, and $S2a=I_{32}$. The correspondence between the binary signals S2a through S2d and the coordinates or indices of the input pixels are shown in the left half of the tables 4a through 4c.

Thus, the enlargement/reduction calculator circuit 2 calculates the grey level signal S3 by means of the following equation:

$$S3=S9a\times(S8a\times S2a+S8b\times S2b)+S9b\times(S8a\times S2c+S8b\times S2d) \quad (6)$$

which corresponds to equation (1) above.

The values of the signals S8a, S8b, S9a and S9b generated by the horizontal weighting coefficients generator 2j and the vertical weighting coefficients generator 2k for the output pixels at (1,1), (2,1), and (3,1) are shown in the table of FIG. 4a. The values of the signals S8a, S8b, S9a and S9b generated by the horizontal weighting coefficients generator 2j and the vertical weighting coefficients generator 2k for the output pixels at (1,2), (2,2), and (3,2) are shown in the table of FIG. 4b. The values of the signals S8a, S8b, S9a and S9b generated by the horizontal weighting coefficients generator 2j and the vertical weighting coefficients generator 2k for the output pixels at (1,3), (2,3), and (3,3) are shown in the table of FIG. 4b. As described above, the relations shown in FIGS. 4a through 4c repeat themselves, in modulo 4 for the coordinates (x,y) of the input pixels and in modulo 3 for the coordinates (X,Y) of the output pixels.

The signal S3 representing the grey level $G_{XY}$ of the output pixels is supplied to the image signal compensator circuit 3. The image signal compensator circuit 3 calculates the signal S4 representing the compensated grey level $C_{XY}$ by means of equation (3) above, where $K_a=1$ and E is the error calculated by the error calculator 5 for the preceding output pixel by means of the equation (5), where $K_b=1$. The signal S4 is quantized by the quantizer 4 by means of the equation (4) above to produce the output image signal S5.

Figure 5:
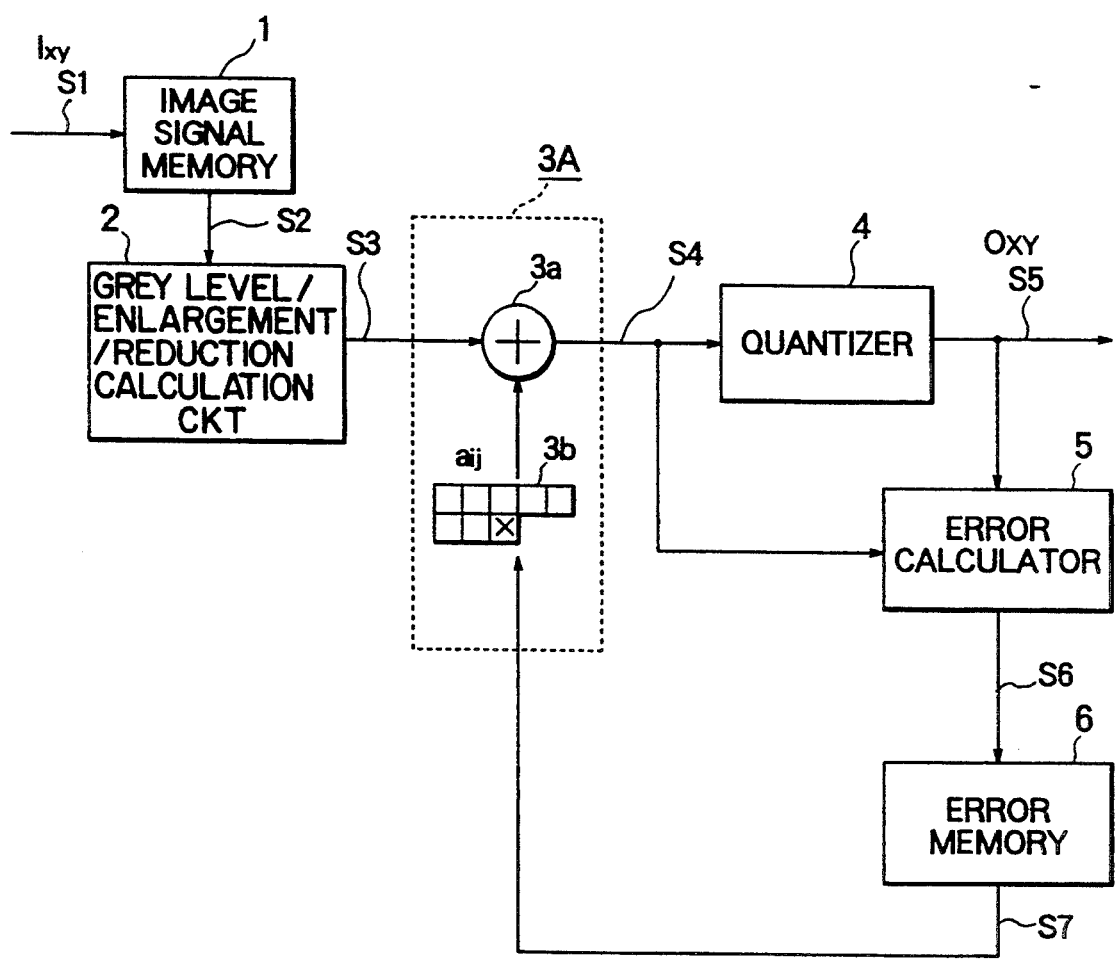
FIG. 5 is a block diagram showing the structure of the image processing device according to the second embodiment of this invention.

FIG. 5 is a block diagram showing the structure of the image processing device according to the second embodiment of this invention, in which the feedback of the error is effected in a more sophisticated manner. The operations of elements other than the image signal compensator circuit 3A and the error memory 6, namely the image signal memory 1, the enlargement/reduction calculator circuit 2, the quantizer 4, and the error calculator 5, are similar to the corresponding parts of the image processing device of FIG. 1. The signal S4 output from the image signal compensator circuit 3A represents the compensated grey level $C_{XY}$ of the output pixel, and the output image signal S5 representing the binary level $O_{XY}$ is calculated by the quantizer 4 by means of the thresholding equations (4) above. The error calculator 5 calculates the signal S6 representing the error $E_{XY}$ at (X,Y) by:

$$E_{XY}=K_b\times(C_{XY}-O_{XY}) \quad (5')$$

where $K_b$ is a feedback parameter which is set equal to unity ($K_b=1$).

The errors $E_{XY}$ calculated by the error calculator 5 are stored in the error memory 6 at respective addresses corresponding to the coordinate (X,Y).

The image signal compensator circuit 3A includes an adder circuit 3a and a weighting circuit 3b. The weighting circuit 3b stores the error weighting coefficients $a_{ij}$ for weighting the preceding errors in the neighborhood of the current coordinate (X,Y) of the output pixel. For example, the relative indices (i,j) of the weighting coefficients $a_{ij}$ range over the relative positions indicated by the seven blank boxes at weighting circuit 3b, relative to the box of the current coordinate (X,Y) marked by X. Then, the weighting circuit 3b reads out from the error memory 6 the errors $E_{X-i,Y-j}$ corresponding to the weighting coefficients $a_{ij}$, respectively, and calculates the weighted error $A_{XY}$ for the output pixel at (X,Y) by the following equation:

$$A_{XY}=\Sigma a_{ij}\times E_{X-i,Y-j} \quad (7)$$

where $a_{ij}$ are assumed to be normalized such that $$\Sigma a_{ij}=1$$

The values of $a_{ij}$ may be set as shown in the following TALBE 1, in which the positions of the coefficients $a_{ij}$ corresponds to those of the boxes at the weighting circuit 3b.

TABLE 1

| | | | | |
|---|---|---|---|---|
| 1/16 | 2/16 | 4/16 | 2/16 | 1/16 |
| 2/16 | 4/16 | X | | |

The adder circuit 3a calculates the signal S4 representing the compensated grey level $C_{XY}$ by:

$$C_{XY}=G_{XY}+K_a\times A_{XY} \quad (3')$$

where $G_{XY}$ is the grey level at (X,Y) represented by the signal S3 output from the enlargement/reduction calculator circuit 2.

Thus, according to this embodiment, the weighted sum of the quantization errors of the seven pixels in the neighborhood of the current output pixel is obtained by means of equation (7) and is added to grey level $G_{XY}$ at the current coordinate (X,Y). The average error is thus minimized in accordance with the minimizing average error method (MAEM), as discussed, for example, in Japanese Laid-Open Patent (Kokai) No. 64-19873.

Figure 6A:
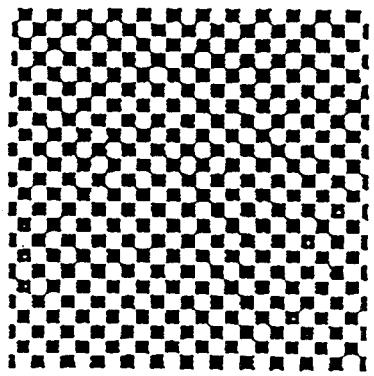
FIG. 6a shows the black and white checkerboard test pattern of the original image.
Figure 6B:
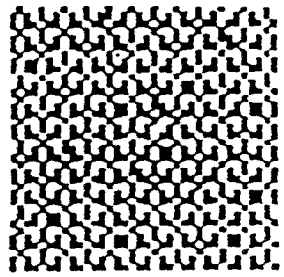
FIG. 6b shows the ¾ reduction image obtained from the original of FIG. 6a by means of the embodiment of FIG. 5 according to this invention.
Figure 6C:
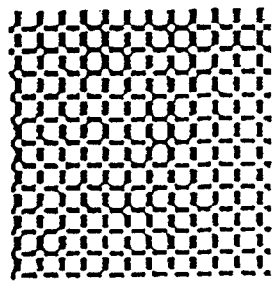
FIG. 6c shows the ¾ reduction image obtained from the original FIG. 6a using the conventional nearest neighbor method (NNM)
Figure 6D:
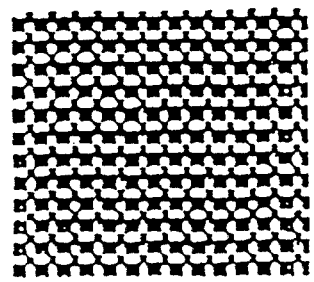
FIG. 6d shows the ¾ reduction image obtained from the original FIG. 6a using the conventional projection method (PM)

FIG. 6a shows the black and white checkerboard test pattern of the original image. FIG. 6b shows the ¾ reduction image obtained from the original of FIG. 6a by means of the embodiment of FIG. 5 according to this invention. It is easy to see that the macroscopic average grey level is preserved at ½. FIG. 6c shows the ¾ reduction image obtained from the original FIG. 6a using the conventional nearest neighbor method (NNM). The macroscopic average grey level is changed to 5/9. FIG. 6d shows the ¾ reduction image obtained from the original FIG. 6a using the conventional projection method (PM). The macroscopic average grey level is changed to 3/9.

FIG. 7a is a 5/7 reduction image obtained by means of the embodiment of FIG. 5 according to this invention from the original bi-level image generated from a portrait (the facsimile test chart No. 1 of the Institute of the Image and Electronics Engineers of Japan) using the ordered dither method (ODM) at 4×4. FIG. 7b is a view similar to that of FIG. 7a, but showing an image obtained with nearest neighbor method (NNM). The reduction factor is 5/7 which corresponds to the reduction from the A3 to the A4 format of the paper size. It is apparent from FIG. 7a that the smooth gradation of is preserved according to this invention. However, as seen from FIG. 7b, according to the conventional nearest neighbor method (NNM), moires are developed and the quality of the image is conspicuously degraded.

Figure 8:
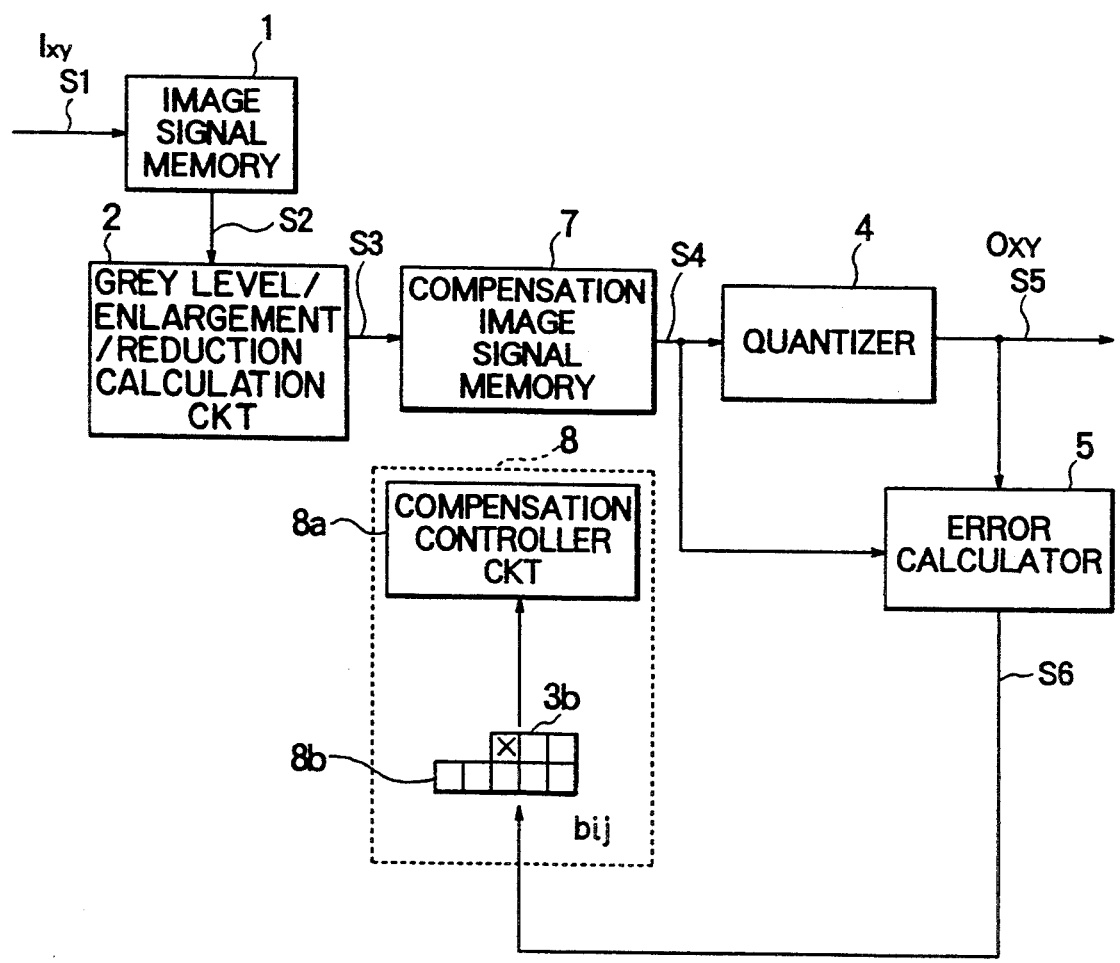
FIG. 8 is a block diagram showing the structure of the image processing device according to the third embodiment of this invention.

FIG. 8 is a block diagram showing the structure of the image processing device according to the third embodiment of this invention. The image processing device of FIG. 8 includes a compensation image signal memory 7 and a image signal compensator circuit 8 in stead of the image signal compensator circuit 3 and the error memory 6 of the image processing device of FIG. 1. The operations of the elements other than the compensation image signal memory 7 and the image signal compensator circuit 8 are similar to those of FIG. 1.

In FIG. 8, the signal S4 represents the compensated grey level $C_{XY}$, and the quantizer 4 determines the output image signal S5 representing the binary level $O_{XY}$ at (X,Y) by thresholding at ½ as expressed by the condition (4) above. The error calculator 5 calculates the error $E_{XY}$ at (X,Y) by means of the equation (5'), where $K_b=1$.

The image signal compensator circuit 8 includes a compensation controller circuit 8a and a weight diffusion circuit 8b. The weight diffusion circuit 8b stores therein the weight diffusion coefficients $b_{ij}$ for the pixels subsequent to, and in the neighborhood of, the current coordinate (X,Y). The relative indices (i,j) range, for example, the positions indicated by the seven blank boxes at the weight diffusion circuit 8b relative to the box at the current coordinate marked by X. Thus, diffused errors $D_{X+i,Y+j}$ for the output pixels at (X+i,Y+j) is calculated by:

$$D_{X+i,Y+j} = b_{ij} \times E_{XY} \quad (8)$$

The compensation controller circuit 8a outputs the diffused errors to the compensation image signal memory 7. The compensation image signal memory 7 stores the diffused errors $D_{X+i,Y+j}$ successively at the respective addresses corresponding to the coordinates (X+i,Y+j). When the current output pixel is moved by one and thus the diffused errors thereof are received from the compensation controller circuit 8a, the compensation image signal memory 7 adds the new diffused errors $D_{X+i,Y+j}$ to the old content at the respective addresses. The accumulated error at the current coordinate (X,Y) corresponds to the weighted error $A_{XY}$ calculated by the above equation (7). Upon receiving the grey level $G_{XY}$ contained in the signal S3 from the enlargement/reduction calculator circuit 2, the compensation image signal memory 7 outputs the signal S4 representing the compensated grey level $C_{XY}$ by means of the equation (3'), where $K_a=1$.

Thus, according to the embodiment of FIG. 8, the quantization error is diffused to the pixels which are subsequently to be processed. This error diffusion method is discussed, for example, in an article by R. Floyd and L. Steinberg, "AN ADAPTIVE ALGORITHM FOR SPATIAL GREY SCALE", SID 75 DIGEST, pp. 36-37.

Figure 9:
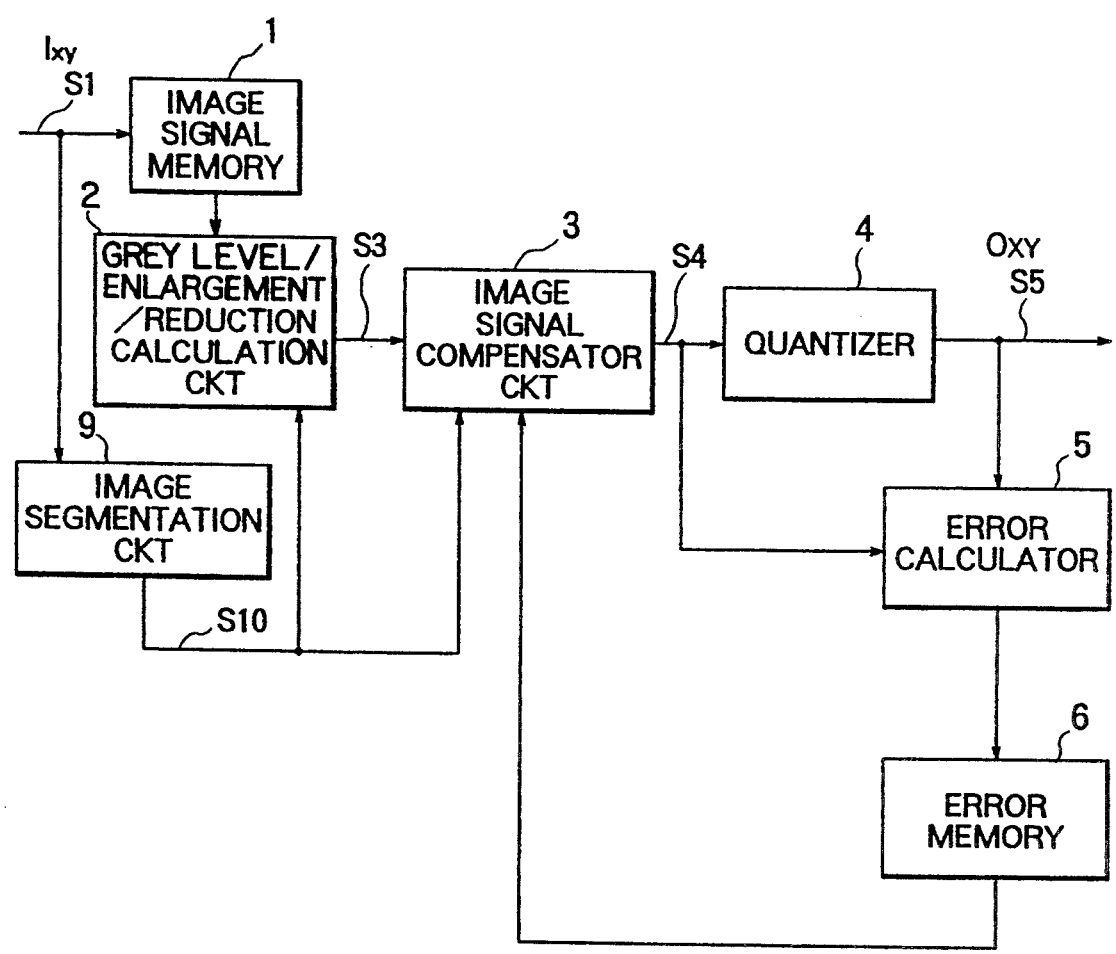
FIG. 9 is a block diagram showing the structure of the image processing device according to the fourth embodiment of this invention.

FIG. 9 is a block diagram showing the structure of the image processing device according to the fourth embodiment of this invention. The image processing device of FIG. 9 is similar to that of FIG. 1, except that it includes an image segmentation circuit 9. Upon receiving the input image signal S1, the image segmentation circuit 9 judges whether the current pixel of the original image matrix is in the bi-level region without half-tone gradations (the text or the line drawing region) or the graphic or quasi-half-tone region resulting from the ordered dither method (ODM), etc. The image segmentation circuit 9 outputs the signal S10 indicating the result of the judgment to the enlargement/reduction calculator circuit 2 and the image signal compensator circuit 3.

When the image segmentation circuit 9 judges that the current input pixel is in the bi-level region, the factors $K_a$ and $K_b$ in the equations (3) and (4) are set less than unity. Preferably, the factors $K_a$ and $K_b$ are set equal to zero: $K_a=K_b=0$. Thus, in the tables of FIG. 4a through 4c, the greater ones of the pair of coefficients S8a and S8b and of the pair of coefficients S9a and S9b are set equal to unity and the others are set to zero, and the calculation by the enlargement/reduction calculator circuit 2 by means of equation 6 is effected accordingly. Further, the image signal compensator circuit 3 effects no compensation for the error E. The conversion according to the conventional nearest neighbor method (NNM) is thus effected.

On the other hand, when the image segmentation circuit 9 judges that the current input pixel is in the quasi-half-tone region, the values of the factors are set equal to unity, such that the same resolution conversion as that according to the embodiment of FIG. 1 is effected.

The image segmentation circuit 9 determines whether or not the current pixel is in the bi-level or quasi-half-tone region as follows: first, the number of color transition (from black to white or from white to black) both in the vertical and the horizontal direction within a block of 4×4 (or possibly 3×5) pixels around the current pixel is determined. If the total number of color transition thus determined is greater than or equal to a predetermined number, e.g., six (6), the pixel is judged to be in the quasi-half-tone region. Otherwise, the pixel is judged to be in the bi-level region. Since the black and the white dots are dispersed in the quasi-half-tone region, the number of color transitions tend to increase. On the other hand, in the bi-level region, the solid black or white area extends over a substantial area to reduce the number of color transitions. Thus, the number of color transition as defined above is a good index for separating the bi-level region from the quasi-half-tone region.

The embodiment of FIG. 9 is effective in removing the shortcomings of the preceding embodiments. In the case of the embodiments of FIG. 1, for example, due to an attempt at preserving the half-tone gradation, annoying corrugated edge may be developed at the contours of a character or a line belonging to the bi-level region of the input image. According to the embodiment of FIG. 9, however, the bi-level regions are processed separately, and such corrugation can be effectively eliminated.

This invention can be applied to a wide variety of image processing devices. For example, in the case of the above embodiments, the quantizer 4 effects bi-level quantization. However, the quantizer 4 may effect multilevel quantization, at from 4 through 16 quantization levels, such that this invention is applied to the multilevel error diffusion method or multilevel minimizing average error method, which are used in the facsimile machines. Further, in the case of the above embodiments, the input image signal S1 is a binary signal. However, the input image signal S1 may be a multilevel signal at from 4 through 16 levels, or at 256 gradation levels. Furthermore, the principle of this invention can be applied to any magnification factor other than $\frac{3}{4}$. For example, this invention is applicable to the image processing devices with a reduction factor less than $\frac{1}{2}$, as disclosed, for example, in Japanese Laid-Open Patent (Kokai) Nos. 64-272377 and 3-127502.

What is claimed is:

1. An image processing device for converting an input matrix of bi-level pixels into an output matrix of bi-level pixels, the input and output matrices having different resolutions of pixels, comprising:
   a grey level calculation circuit for generating a sequence of multi-level signals from the input matrix of bi-level pixels by a projection method, a multi-level signal being generated for a target output pixel responsive to a set of all input pixels that intersect the target output pixel, wherein each of the set of input pixels contributes to the multi-level signal in proportion to an extent to which it intersects the target output pixel; and
   a quantizing error diffusion circuit, coupled to said grey level calculation circuit, for converting each multi-level signal into a bi-level signal, and for maintaining an average grey level in the output matrix substantially equal to an average grey level in the input matrix.

2. The image processing device as claimed in claim 1, wherein said grey level calculation circuit further includes:
   a weight-generating circuit, one weight being generated for each pixel of the set of all input pixels that intersect the target output pixel, wherein a weight for an input pixel is indicative of a fraction of a total area of the target output pixel that is intersected by an area of the input pixel; and
   a summing circuit for calculating each multi-level value responsive to a summation over the set of input pixels intersecting the target output pixel of the weight of each input pixel.

3. The image processing device as claimed in claim 1, wherein the quantizing error diffusion circuit further comprises:
   a compensation circuit, coupled to the grey level calculation circuit, for combining each multi-level signal with a sequence of quantization errors to obtain a sequence of compensated multi-level signals;
   a quantization circuit for comparing the sequence of compensated multi-level signals with a predetermined threshold signal to generate a sequence of bi-level output signals that represents the pixels of the output matrix;
   an error calculation circuit for calculating a sequence of difference signals responsive to differences between said compensated multi-level signals and said bi-level output signals; and
   an error memory for delaying said difference signals and for generating said sequence of quantization errors for delivery to said compensation circuit, so as to compensate for an error in grey scale of the output pixels.

4. The image processing device as claimed in claim 3, wherein said compensation circuit further includes:
   a weighting circuit, coupled to said error memory and receiving the sequence of quantization errors, which applies a set of the quantization errors in a predetermined neighborhood of a current output pixel, to calculate a weighted sum of the set of quantization errors for the output pixel; and
   an arithmetic circuit for combining said weighted sum with each multi-level signal to obtain said compensated multi-level signals.

5. The image processing device as claimed in claim 3, wherein said compensation circuit includes:
   a weighting circuit which receives a sequence of quantization errors in a predetermined neighborhood of a current pixel, calculates a weighted sum of the quantization errors, and outputs the weighted sum; and
   an adder for receiving and adding said weighted sum of quantization errors to said multi-level signals to obtain said compensated multi-level signals.

6. The image processing device as claimed in claim 1, wherein the quantizing error diffusion means further includes means, responsive to at least one control input, for selectively enabling and disabling grey level compensation, and further comprising:
   image segmentation means for determining whether a current input pixel is in one of a bi-level region and a half-tone region of the input matrix;
   means, responsive to a determination that said current pixel is in a half-tone region, for establishing a value of the at least one control input to enable grey level compensation; and
   means, responsive to a determination that said current pixel is in a bi-level region, for establishing a value of the at least one control input to disable grey level compensation.

7. An image processing device for converting an input matrix of bi-level pixels into an output matrix of bi-level pixels, the input and output matrices having different resolutions of pixels, comprising:

a memory for receiving and temporarily storing input binary levels of the input pixels;

grey level calculation means for generating a sequence of multi-level signals from the input matrix of bi-level pixels by a projection method, a multi-level signal being generated for a target output pixel responsive to a set of all input pixels that intersect the target output pixel, wherein each of the set of input pixels contributes to the multi-level signal in proportion to an extent to which it intersects the target output pixel; and quantizing error diffusion means, coupled to said grey level calculation means, for converting each multi-level signal into a bi-level signal, and for maintaining an average grey level in the output matrix substantially equal to an average grey level in the input matrix.

8. An image processing device as claimed in claim 7, wherein said grey level calculation means further includes:

means for generating a set of weights, one weight for each pixel of the set of all input pixels that intersect the target output pixel, wherein a weight for an input pixel is indicative of a fraction of a total area of the target output pixel that is intersected by an area of the input pixel; and means for calculating each multi-level value responsive to a summation over the set of input pixels intersecting the target output pixel of the weight of each input pixel.

9. An image processing device as claimed in claim 8, wherein the quantizing error diffusion means further comprises:

compensation means, coupled to the grey level calculation means, for combining each multi-level signal with a sequence of quantization errors to obtain a sequence of compensated multi-level signals;

quantization means for comparing the sequence of compensated multi-level signals with a predetermined threshold signal to generate a sequence of bi-level output signals that represents the pixels of the output matrix;

error calculation means for calculating a sequence of difference signals responsive to differences between said compensated multi-level signals and said bi-level output signals; and error memory means for delaying said difference signals and for generating said sequence of quantization errors for delivery to said compensation means, so as to compensate for in error an grey scale of the output pixels.

10. An image processing device as claimed in claim 9, wherein said compensation means further includes:

a weighting circuit, coupled to said error memory means and receiving the sequence of quantization errors, which applies a set of the quantization errors in a predetermined neighborhood of a current output pixel, to calculate a weighted sum of the set of quantization errors for the output pixel; and arithmetic means for combining said weighted sum with each multi-level signal to obtain said compensated multi-level signals.

11. The image processing device of claim 10, wherein the set of quantization errors in the predetermined neighborhood of the current output pixel are computed for output pixels preceding the current output pixel.

12. The image processing device of claim 10, wherein the set of quantization errors in the predetermined neighborhood of the current output pixel are computed for output pixels following the current output pixel.

13. The image processing device of claim 10, wherein the weighted sum of the set of quantization errors is normalized so that a sum of weights used to calculate the weighted sum has a value of one.

14. The image processing device of claim 9, wherein the error memory means delays each of said difference signals by one pixel.

15. The image processing device of claim 8, wherein the weight of an input pixel contributes to the summation responsive to the bi-level value of the input pixel.

16. An image processing device as claimed in claim 7, wherein the quantizing error diffusion means further comprises:

compensation means, coupled to the grey level calculation means, for combining each multi-level signal with a sequence of quantization error to obtain a sequence of compensated multi-level signals;

quantization means for comparing the sequence of compensated multi-level signals with a predetermined threshold signal to generate a sequence of bi-level output signals that represents the pixels of the output matrix;

error calculation means for calculating a sequence of difference signals responsive to differences between said compensated multi-level signals and said bi-level output signals; and error memory means for delaying said difference signals and for generating said sequence of quantization errors for delivery to said compensation means, so as to compensate for an error in grey scale of the output pixels.

17. An image processing device as claimed in claim 16, wherein said compensation means further includes:

a weighting circuit, coupled to said error memory means and receiving the sequence of quantization errors, which applies a set of the quantization errors in a predetermined neighborhood of a target output pixel, to calculate a weighted sum of the set of quantization errors for the output pixel; and arithmetic means for combining said weighted sum with each multi-level signal to obtain said compensated multi-level signals.

18. The image processing device of claim 17, wherein the set of quantization errors in the predetermined neighborhood of the current output pixel is computed for output pixels preceding the current output pixel.

19. The image processing device of claim 17, wherein the set of quantization errors in the predetermined neighborhood of the current output pixel is computed for output pixels following the current output pixel.

20. The image processing device of claim 17, wherein the weighted sum of the set of quantization errors is normalized so that a sum of weights used to calculate the weighted sum has a value of one.

21. An image processing device as claimed in claim 16, wherein said compensation means includes:

a weighting circuit which receives the sequence of quantization errors, said sequence of quantization errors being in a predetermined neighborhood of a current pixel, calculates a weighted sum of the quantization error, and outputs the weighted sum; and adder means for receiving and adding said weighted sum of quantization errors to said multi-level signals to obtain said compensated multi-level signals.

22. The image processing device of claim 16, wherein the error memory means delays each of said difference signals by one pixel.

23. An image processing device as claimed in claims 7, 8, 16, or 17, wherein the quantizing error diffusion means further includes means, responsive to at least one control input, for selectively enabling and disabling grey level compensation, and further comprising:
    image segmentation means for receiving said input pixels, and for determining whether a current pixel is in one of a bi-level region and a half-tone region of the input matrix;
    means, responsive to a determination that said current pixel is in a half-tone region, for establishing a value of the at least one control input to enable grey level compensation; and
    means, responsive to a determination that said current pixel is in a bi-level region, for establishing a value of the at least one control input to disable grey level compensation.

24. The image processing device of claim 23, wherein the image segmentation means further includes:
    means for counting a number of color transitions in a predetermined window around the target output pixel; and
    means for determining whether the number of color transitions counted exceeds a predetermined threshold.

25. The image processing device of claim 7, further including means for selecting a ratio of a resolution of pixels in the output matrix to a resolution of pixels in the input matrix over a substantially continuous range.

26. The image processing device of claim 25, wherein the means for generating the set of weights operates in response to the means for selecting.

27. The image processing device of claim 7, wherein the memory stores greater than one line of pixels of the input matrix.

28. A method of converting an input matrix of bi-level input pixels into an output matrix of bi-level pixels, wherein the input and output matrices have different dimensions, comprising the steps of:
    A) generating a sequence of multi-level signals from the input matrix of bi-level pixels by a projection method, a multi-level signal being generated for a target output pixel responsive to a set of all input pixels that intersect the target output pixel, wherein each of the set of input pixels contributes to the multi-level signal in proportion to an extent to which it intersects the target output pixel;
    B) converting each multi-level signal into a bi-level signal, including compensating, by an error diffusion method, an average grey level in the output matrix to substantially equal to an average grey level in the input matrix; and
    C) outputting each bi-level signal converted in the step B to an output device.

29. The method of claim 28 wherein the step A of converting further includes:
    A1) generating a set of weights, one weight for each pixel of the set of input pixels that intersects the target output pixel, wherein a weight for an input pixel is indicative of a fraction of a total area of the target output pixel that is intersected by an area of the input pixel; and
    A2) calculating each multi-level value responsive to a summation over the set of input pixels intersecting the target output pixel of the weight of each input pixel.

30. The method of claim 29, further including selecting a ratio of a resolution of pixels in the output matrix to a resolution of pixels in the input matrix over a substantially continuous range.

31. The method of claim 30, wherein the step A1 of generating the set of weights operates in response to the step of selecting.

32. The method of claim 29, wherein the weight of an input pixel contributes to the summation responsive to the bi-level value of the input pixel.

33. The method of claim 28, wherein the step B further comprises:
    B1) combining each multi-level signal with a sequence of quantization errors to obtain a sequence of compensated multi-level signals;
    B2) comparing the sequence of compensated multi-level signals with a predetermined threshold signal to generate a sequence of bi-level output signals that represents the pixels of the output matrix;
    B3) calculating a sequence of difference signals responsive to differences between said compensated multi-level signals and said bi-level output signals; and
    B4) delaying said difference signals to generate said sequence of quantization errors, so as to compensate for an error in grey scale of the output pixels.

34. The method of claim 33, wherein the step B1 further includes:
    B1a) applying weighting coefficients to each of a set of the quantization errors in a predetermined neighborhood of a target output pixel, to calculate a weighted sum of the set of quantization errors for the target output pixel; and
    B1b) combining said weighted sum with a multi-level signal to obtain said compensated multi-level signal.

35. The method of claim 34, wherein the set of quantization errors in the predetermined neighborhood of the current output pixel is computed for output pixels preceding the current output pixel.

36. The method of claim 34, wherein the set of quantization errors in the predetermined neighborhood of the current output pixel is computed for output pixels following the current output pixel.

37. The method of claim 34, wherein the weighted sum of the set of quantization errors is normalized so that a sum of weights used to calculate the weighted sum has a value of one.

38. The method of claim 33, wherein the step B4 of delaying delays each of said difference by one pixel.

39. The method as claimed in claim 28, further comprising:
    determining whether a current input pixel is in one of a bi-level region and a half-tone region of the input matrix;
    enabling, responsive to a determination that said current input pixel is in a half-tone region, the step of compensating by the error diffusion method of the step B so that a grey level of the pixels of the output matrix is compensated; and
    disabling, responsive to a determination that said current input pixel is in a bi-level region, the step of compensating by the error diffusion method of the step B.

40. The method of claim 39, wherein the step of determining further includes:
    counting a number of color transitions in a predetermined window around the target output pixel; and
    determining whether the number of color transitions counted exceeds a predetermined threshold.

* * * * *